United States Patent [19]

Quan

[11] Patent Number: 5,058,159

[45] Date of Patent: Oct. 15, 1991

[54] METHOD AND SYSTEM FOR SCRAMBLING AND DESCRAMBLING AUDIO INFORMATION SIGNALS

[75] Inventor: Ronald Quan, Cupertino, Calif.

[73] Assignee: Macrovision Corporation, Mountain View, Calif.

[21] Appl. No.: 366,575

[22] Filed: Jun. 15, 1989

[51] Int. Cl.⁵ .................. H04N 7/16; H04N 7/167
[52] U.S. Cl. .................................... 380/19; 380/5; 380/9; 380/38
[58] Field of Search ............... 380/3, 5, 9, 10, 19, 380/38, 39

[56] References Cited

U.S. PATENT DOCUMENTS 4,747,137  5/1988  Matsunaga ..................... 380/9 X

FOREIGN PATENT DOCUMENTS 0074810  3/1983  European Pat. Off. ................ 380/5

Primary Examiner—Stephen C. Buczinski
Assistant Examiner—Bernard E. Gregory
Attorney, Agent, or Firm—Townsend and Townsend

[57] ABSTRACT

Audio signals are scrambled by inverting the original frequency spectrum so that frequency portions originally lying at the lower end of the audio frequency band are shifted to the upper end while those portions originally lying near the upper end of the band are shifted to the lower end. A pilot tone of known frequency is recorded along with the frequency shifted audio signals, along with accompanying video signal portions. Upon reproduction, any variations in phase and frequency introduction by the recording or reproduction process are tracked by the pilot tone, which is used to generate the demodulation signal for restoring the original frequency content of the audio signals.

22 Claims, 7 Drawing Sheets

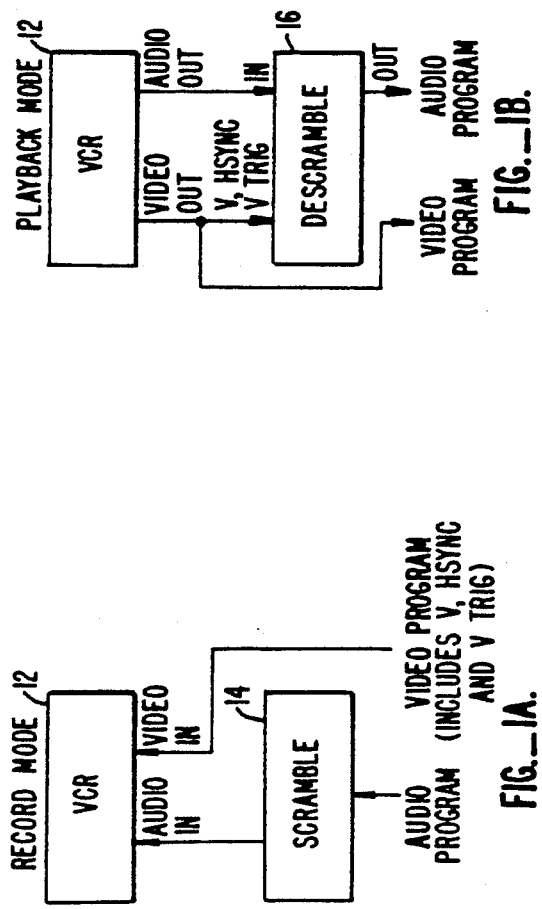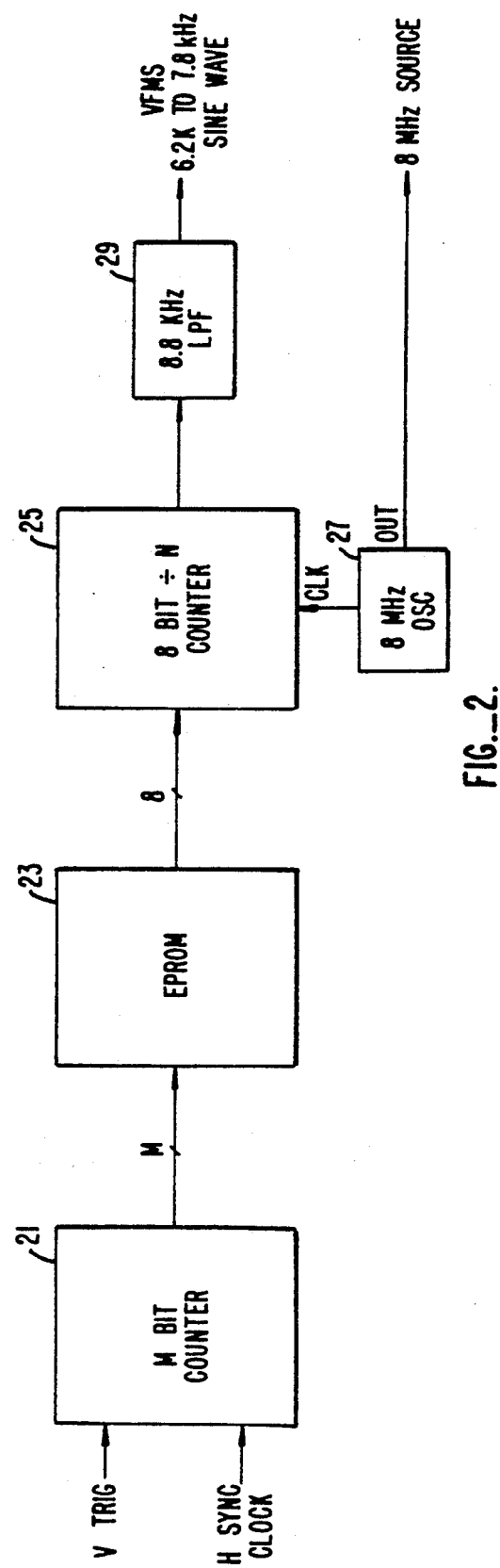

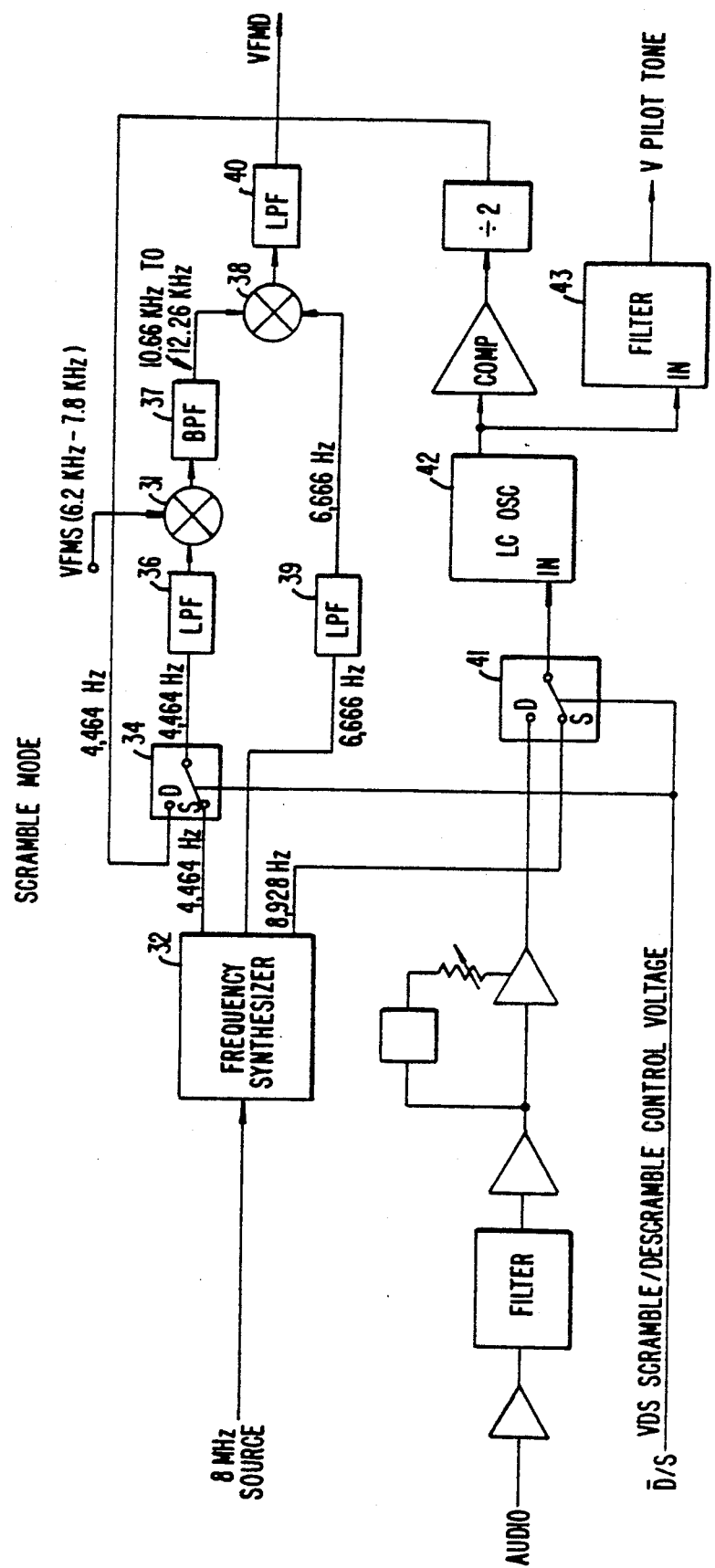
FIG._3.

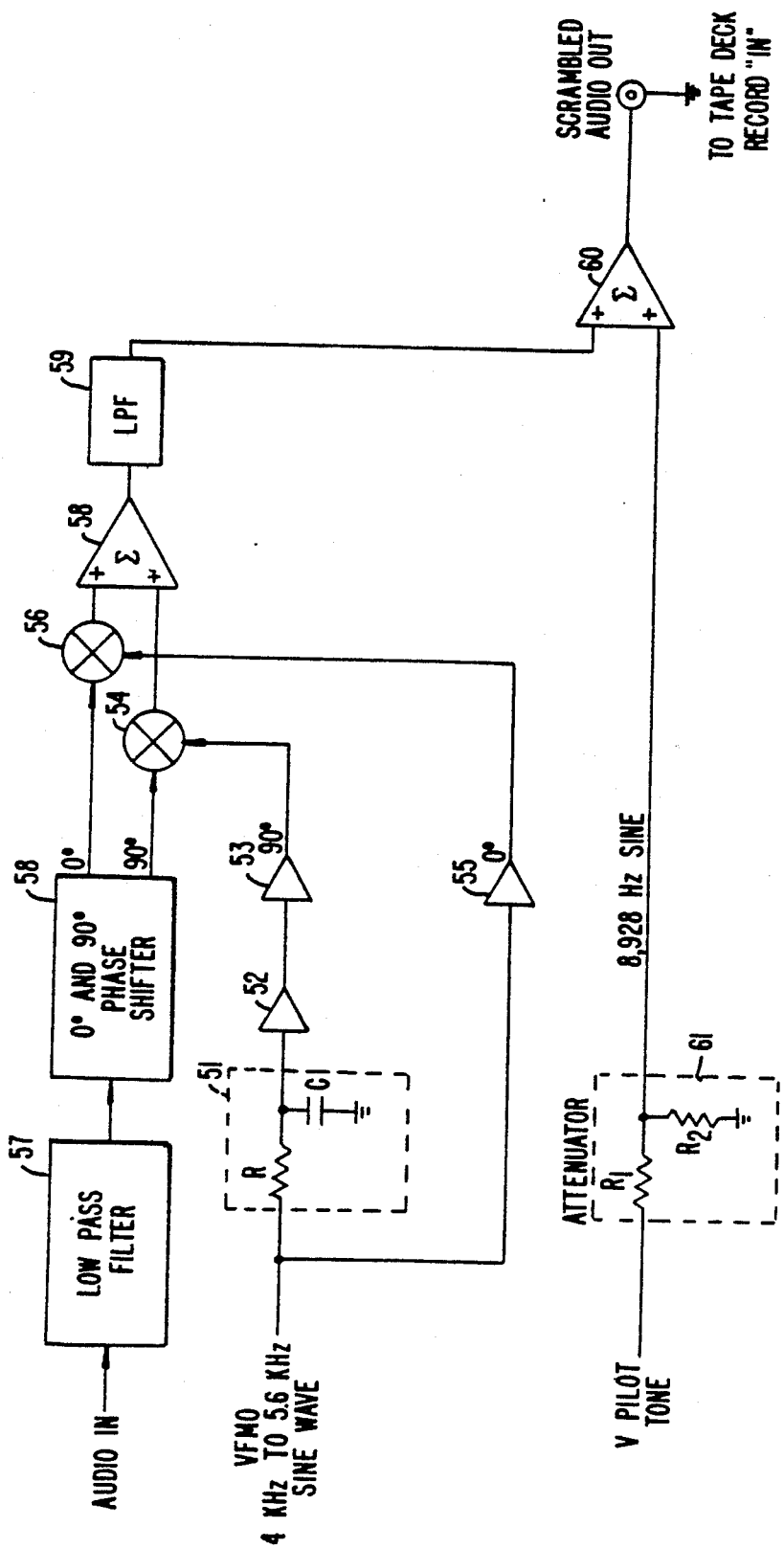
FIG._4.

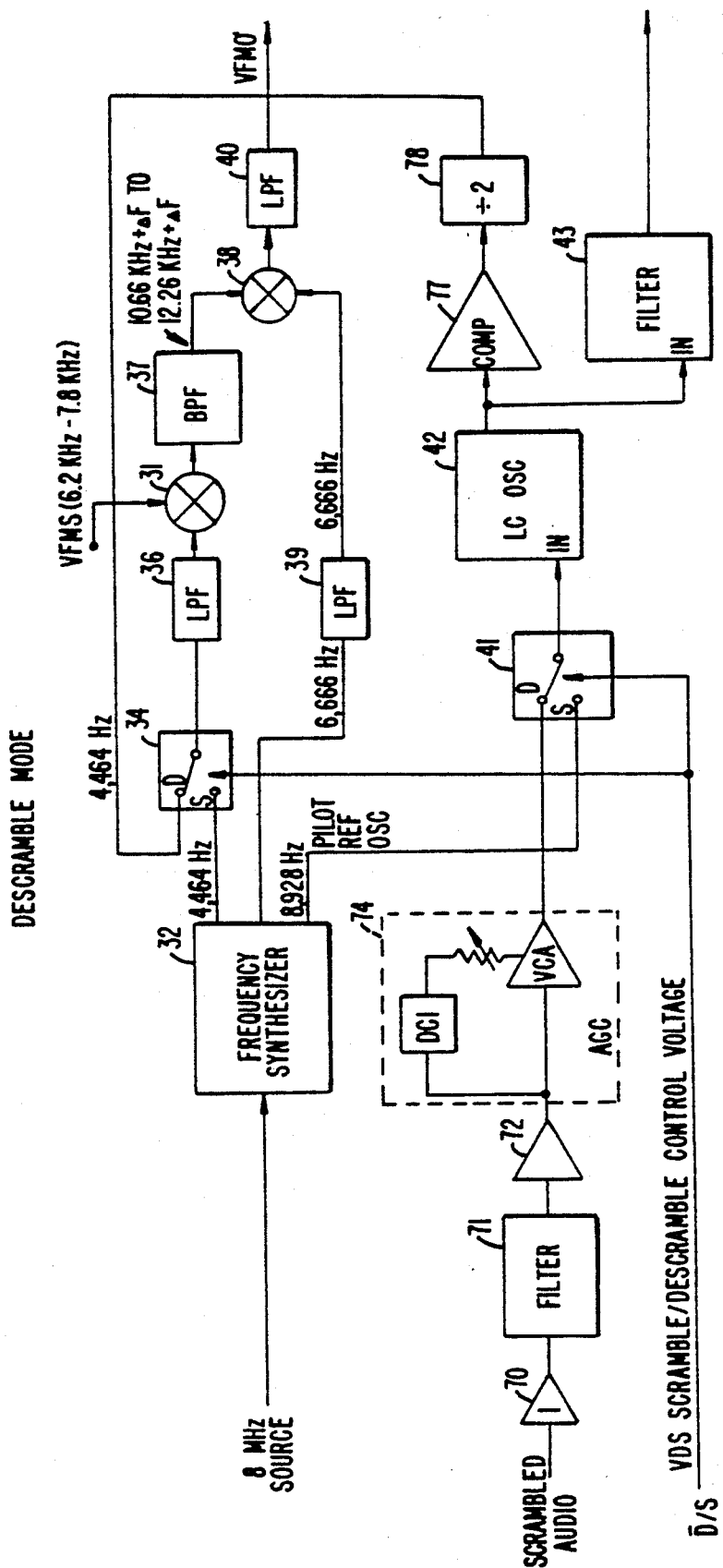
FIG._5.

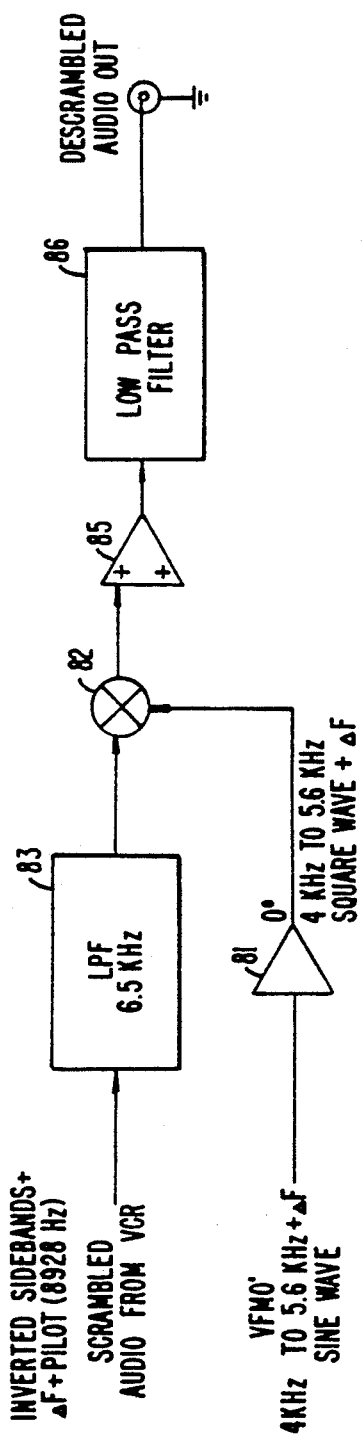
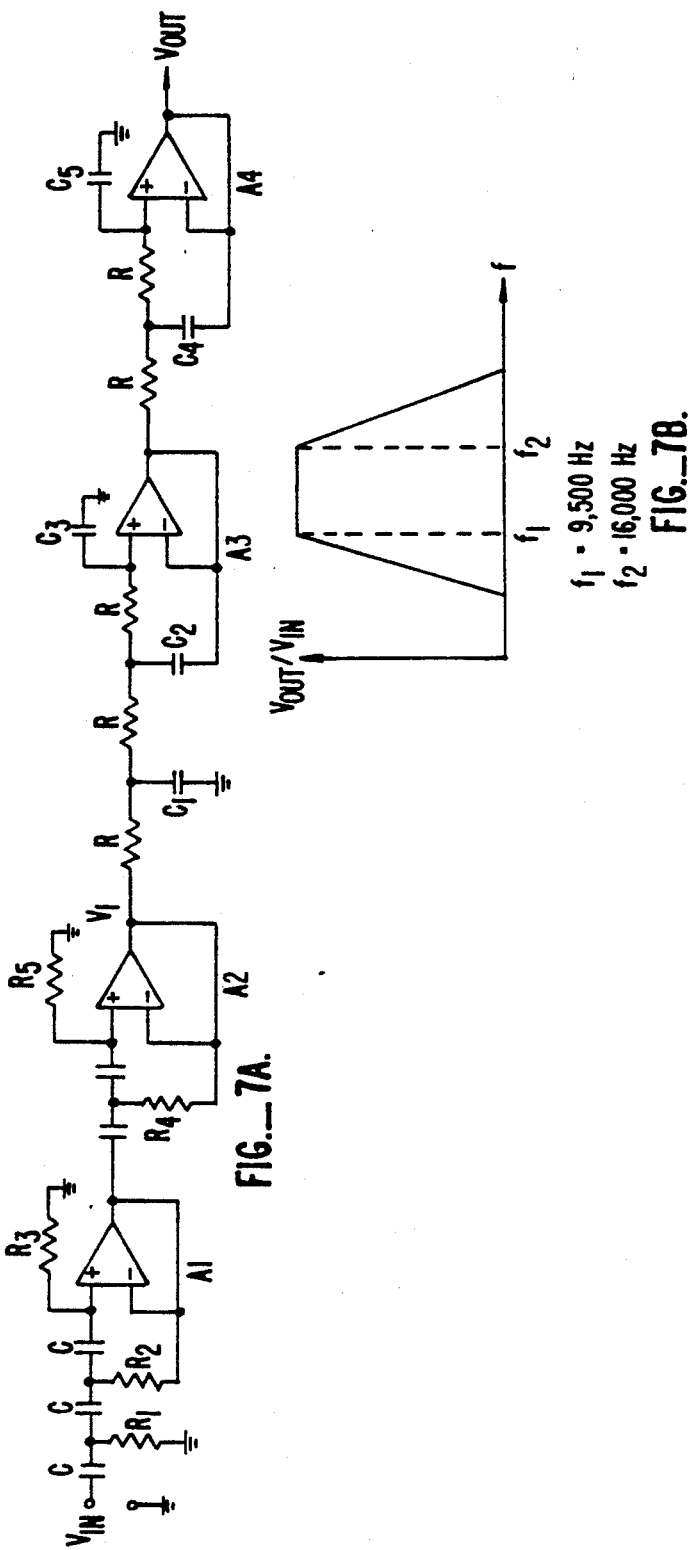

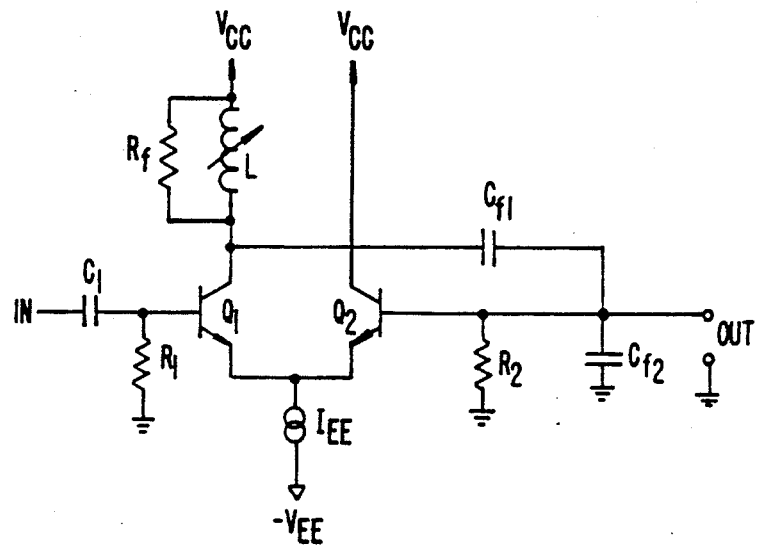
FIG._8.
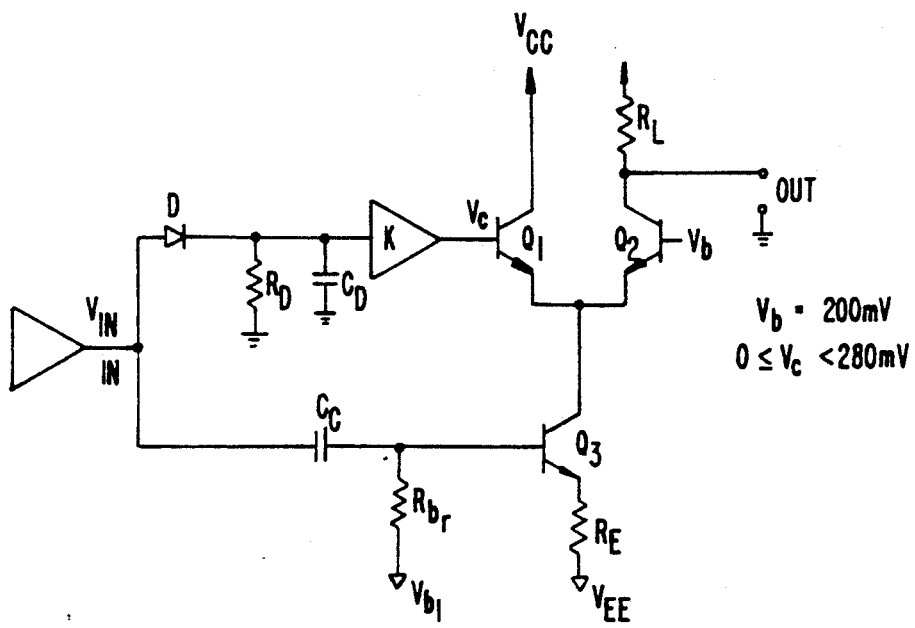
FIG._10.

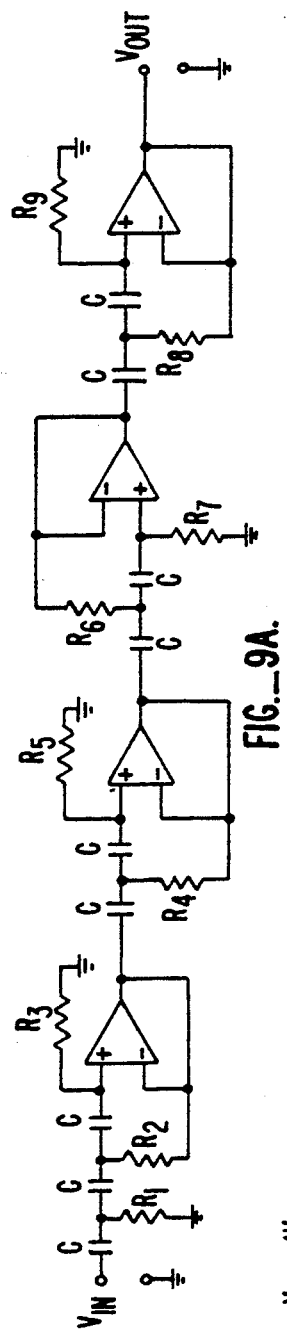
FIG._9A.
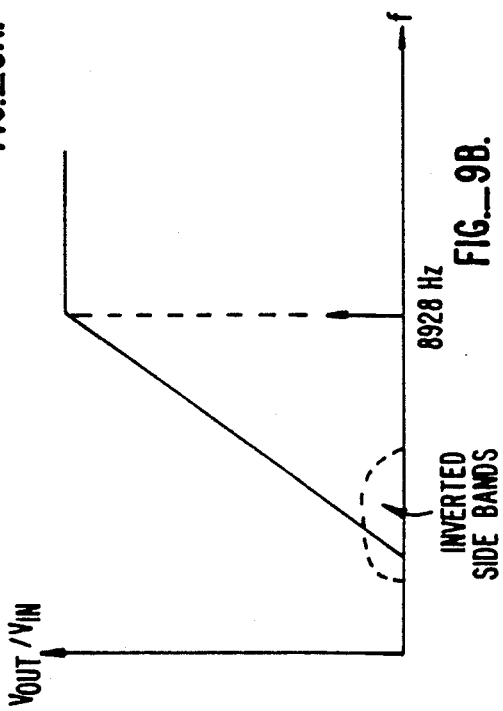
FIG._9B.

METHOD AND SYSTEM FOR SCRAMBLING AND DESCRAMBLING AUDIO INFORMATION SIGNALS

BACKGROUND OF THE INVENTION

This invention relates to techniques for scrambling and descrambling audio information signals. More particularly, this invention relates to frequency shifting techniques for scrambling and descrambling such signals.

Various techniques have been employed in the past for the purpose of initially scrambling and subsequently descrambling audio information signals. One such technique is known as frequency shifting, wherein the spectrum of original audio information signals is shifted by inversion so that those frequency portions originally lying at the lower end of the audio frequency band are shifted to the upper end while those portions originally lying near the upper end of the band are shifted to the lower end. Typically, this spectral inversion of the original audio information signals is performed prior to recording the signals either alone, or in combination with associated video signals. The purpose of such scrambling, of course, is to prevent unauthorized reproduction or other use. As one commercial example, prerecorded video cassettes can be rendered unintelligible by scrambling the audio information portion, so that only an authorized subscriber having a proper descrambling unit coupled to the television monitor/receiver can enjoy the program information by descrambling the audio portion.

A major disadvantage with known audio scrambling devices using frequency shifting techniques is the introduction of frequency error upon recording and reproduction of the scrambled signals which adversely affects the descrambling process. In particular, if the scrambled audio signals are recorded on tape there is an unpredictable frequency error which typically occurs in a random fashion upon reproduction of the signals due to mechanical and/or electrical deficiencies in the recording and playback units. During descrambling, this frequency error introduces unwanted components into the recovered signals, resulting in garbled sounds which are annoying at best and unrecognizable at worst.

SUMMARY OF THE INVENTION

The invention comprises a method and system for enabling scrambling of original audio information signals using the frequency spectrum inversion technique which substantially reduces the adverse effect of frequency variations in the reproduction of the scrambled signals to produce final audio signals of quality comparable to the original unscrambled signals.

From a method standpoint, the invention broadly comprises frequency shifting original audio information signals to produce scrambled audio information signals, generating a pilot signal of a preselected frequency, preferably lying outside the frequency range of the original audio signals, and recording both the scrambled audio information signals and the pilot signal on a common recording medium so that any frequency variations introduced in the scrambled audio signals upon playback are tracked by the pilot signal. The frequency shifting preferably includes varying the magnitude of the frequency shift, preferably on a pseudo random basis, with the inversion of the original audio signal spectrum comprising the preferred embodiment. For audio signals which are associated to video signals, the method further includes generating coded information signals specifying the manner in which the frequency shifting is performed and associating these coded information signals to the recorded scrambled audio information signals, preferably by embedding the coded information signals into a preselected portion of the video, such as within a video blanking interval, on a preselected frame basis.

Upon reproduction of the scrambled audio signals, the pilot signal is separated from the scrambled audio information signals and used to generate the frequency restoring demodulation signal, which is then used to demodulate the reproduced scrambled audio information signals to produce final audio information signals lying within the original frequency spectrum. It should be noted that the preferred technique for scrambling and descrambling employs single side band modulation. For those audio signals with which coded information signals are associated, during descrambling the coded information signals are recovered and used to control the selection of the starting frequency and reinitialization at preselected intervals.

Since the pilot signal of constant frequency is recorded along with the scrambled audio signals on the common recording medium, any frequency fluctuations introduced into the scrambled audio signals upon reproduction are tracked by the reproduced pilot signal as well. Consequently, these unpredictable frequency variations are carried through into the demodulation signal in such a way as to cancel out the ordinarily adverse effect of such frequency variations. As a result, the finally reproduced audio information signals have a quality substantially equal to that of the original audio signals, subject to the bandwidth constraints of the entire recording system.

For a fuller understanding of the nature and advantages of the invention, reference should be had to the ensuing detailed description taken in conjunction with the accompanying drawings.

BRIEF DESCRIPTION OF THE DRAWINGS

FIG. 1A is a block diagram illustrating scrambling of the audio portion of composite video signals;

FIG. 1B is a block diagram illustrating descrambling of previously scrambled signals;

FIG. 2 is a schematic diagram illustrating the timing circuitry used to determine modulation carrier signal frequency in the scrambling/descrambling units;

FIG. 3 is a schematic diagram illustrating the modulation carrier signal generator and pilot signal generator circuitry in the scrambling/descrambling units;

FIG. 4 is a schematic diagram illustrating the modulation circuitry for scrambling the original audio signals;

FIG. 5 is a schematic diagram similar to FIG. 3 with the mode switches in the descramble position;

FIG. 6 is a schematic diagram illustrating the demodulation circuitry for descrambling the scrambled audio signals;

FIG. 7A is a circuit diagram of filter 37;

FIG. 7B is a diagram of the frequency characteristics of the circuit shown in FIG. 7A.

FIG. 8 is a circuit diagram of oscillator 42;

FIG. 9A is a circuit diagram of filter 71; and

FIG. 9B is a diagram of the frequency characteristics of the circuit shown in FIG. 9A.

FIG. 10 is a circuit diagram of variable gain circuit 74.

DESCRIPTION OF THE PREFERRED EMBODIMENT

Turning now to the drawings, FIG. 1A illustrates use of the invention to scramble the audio portion of video program signals prior to recording both the video and the audio portions onto a video cassette. As seen in this Fig. the video program information, including the vertical and horizontal sync information and additional coded information signals termed "v trig" (described below) are, coupled directly to the video input of a conventional video cassette recorder 12. The audio portion, on the other hand, is coupled to the audio input of the scrambling unit 14 in which the audio signals are scrambled in the manner described below. The scrambled audio output signals from scrambling unit 14 are then coupled to the audio input terminal of video cassette recorder unit 12. FIG. 1B illustrates the playback mode for the video and scrambled audio signals prepared in the FIG. 1A system. As seen in FIG. 1B, the video program information appearing at the video output terminal of the VCR unit 12 is coupled directly to the associated follow-on electronics (i.e., the television monitor). The scrambled audio signals, in contrast, are coupled to the input of a descramble unit 16. Also, at least the vertical and horizontal sync and v-trig signal portions of the video output from VCR unit 12 are coupled to the control signal input of descramble unit 16 for descrambling in the manner described below. The output from the descramble unit 16 is the audio program portion, now unscrambled.

The scrambling technique employed in the preferred embodiment of the invention is the spectral inversion technique. In particular, the original audio information signals are processed by single side band modulation to invert the frequency spectrum, so that those portions of the original audio information signals originally at the low end of the frequency spectrum appear in the high end and vice versa. In addition, the frequency of the modulation carrier signal is periodically changed so that the absolute value of a given frequency in the original audio information signal spectrum changes whenever the frequency of the modulation carrier signal is changed. As a result, the scrambled audio signals, if applied to conventional audio processing circuitry of a receiver/monitor, are so garbled as to be unusable. In addition to the spectral inversion processing, a fixed frequency pilot signal is recorded along with the scrambled audio signals so that any frequency variations introduced during the reproduction processing of the audio signals are faithfully reflected in frequency variations observed in the pilot signal, which frequency variations are then used in the demodulation signal processing to produce final audio signals devoid of such frequency variations. Typically, these frequency variations are due to speed changes in the tape transport mechanism, which introduce variable frequency effects commonly known as wow and flutter.

The periodic changing of the modulation carrier frequency is performed in synchronism with preselected timing portions of the associated video signal, such as the horizontal sync pulse present in each active video line. Thus, the modulation carrier signal can be step changed every K horizontal lines, where K is a real number. Also, initializing information is periodically embedded into the vertical blanking portion of the video information in order to provide initialization or periodic step change modification to the modulation carrier signal frequency selection process.

FIG. 2 illustrates the timing circuitry used to determine the modulation carrier signal frequency in both the scramble unit 14 and the descramble unit 16. As seen in this Fig. a 15 bit digital down counter 21 is started to an initial value by means of a signal termed "v trig", which is a trigger signal of a recognizable value generated in a known way and inserted into the vertical blanking interval of a given field of information. The counter resets when it reaches zero state from all lines. Counter 21 is clocked by another timing signal, termed "h sync", which is directly related to the conventional horizontal sync pulses found in each line of active video information. Thus, after initialization by a v trig signal, counter 21 is decremented once per active video line. The 15 bit count output of counter 21 is coupled to a 32K by 8 bit EPROM containing a suitable count sequence, preferably a pseudo random sequence. Thus, for each change in the state of counter 21, there is a different address accessed in EPROM 23, and the contents at this address are read out to another counter 25. The 8 bit value coupled to counter 25 from EPROM 23 presets the counter 25 to a given value. The clock input of counter 25 receives an 8 mhz clock signal from a stable 8 mhz oscillator 27. Thus, counter 25 outputs an overflow signal at a rate determined not only by oscillator 27 but also by the starting preset value supplied by EPROM 23. The output of counter 25 is low pass filtered through a filter unit 29 to produce a sinusoidal output signal termed "VFMS", which is a sine wave signal shifting pseudo randomly in frequency from 6.2 khz to 7.8 khz.

FIG. 3 illustrates that portion of the scrambling unit of FIG. 1A in which the modulation carrier signal and the pilot signal are generated. As seen in this Fig. the variable frequency sine wave signal VFMS from the timing unit shown in FIG. 2 is coupled to a first input of a first mixer 31. The 8 mhz output signal from stable oscillator 27 of FIG. 2 is coupled to the source input of a frequency synthesizer 32 having three separate outputs: a first output of 4464 hz, a second output of 6666 hz and a third output of 8928 hz. The first output is coupled via a mode switch 34 (during scramble mode operation) through a low pass filter 36 having a cut-off of 5.5 khz to the other input of mixer 31. The output of mixer 31 is coupled through a band pass filter 37 (See FIG. 7) having a pass band extending from 9500 hz to 16,000 hz, and the output of band pass filter 37 is coupled to a first input of a second mixer 38. The second output of frequency synthesizer 32, viz., the 6666 hz signal, is coupled via a low pass filter 39 having a cut-off frequency of 8.8 khz to the second input of mixer 38. The output of mixer 38 is filtered through a 6500 hz low pass filter 40 and comprises the modulation signal carrier VFMO having a pseudo randomly varying frequency lying in the range from 4 khz to 5.6 khz.

The remaining output of frequency synthesizer 32 is coupled through a mode switch 41 (during scramble mode) to the input of an LC oscillator 42 shown in FIG. 8. The output of oscillator 42 is coupled through a two pole low pass filter 43, the output of which comprises the pilot signal.

FIG. 4 illustrates the single side band modulation processing section of the scramble unit 14. As seen in this Fig. the modulation signal carrier VFMO is phase shifted by 90° by an RC unit 51 and the 90° phase shifted output from unit 51 is boosted by amplifier 52 prior to limiting in a limiter amplifier 53 in order to provide a constant amplitude 90° phase shifted modulation carrier signal as a first input to a mixer 54. The VFMO signal is also coupled directly to a limiter amplifier 55 to produce a constant amplitude 0° phase shifted version of the signal which is coupled as a first input to a mixer 56. The audio input signal is low pass filtered in a filter unit 57 having a 3500 hz cut-off frequency and coupled to a phase shifter unit 58 which provides a 0° phase shift and a 90° phase shift version of the original audio input signal. The 0° phase shift version is coupled to the other input of mixer 56, while the 90° phase shifted version is coupled to the other input of mixer 54. The outputs of mixers 56 and 54 are added in summing amplifier 58 and low pass filtered in a filter unit 59 having a cut-off frequency of 6500 hz in order to provide a single side band suppressed carrier filtered signal to one input of a summing amplifier 60.

The pilot signal from filter 43 (FIG. 3) is coupled through an attenuator 61 to reduce the amplitude thereof with respect to the inverted audio output from filter 59, and the attenuated pilot signal is coupled to the other input of summing amplifier 60. The output of summing amplifier 60 comprises scrambled audio having an inverted spectrum from the original audio signals and a pilot signal of reduced amplitude (typically −10db from the level of the scrambled audio).

As noted above, the combined scrambled audio output and pilot signal is recorded on a video cassette using conventional VCR unit 12 (FIG. 1A), along with the video information portion of the signal. As will now be appreciated, if this cassette is merely played back directly without some attempt to descramble the audio, the result will be observed on the user monitor as a program with viewable video but unintelligible audio. In order to be useful, the playback unit must be provided with a descrambler unit 16 illustrated in FIG. 1B in order to recover the original audio information signals. In the preferred embodiment, the descramble unit 16 is essentially identical to the scramble unit 14: i.e., there is effectively one universal unit used for both modes. The mode of operation is determined by the state of the two mode switches 34, 41 shown in FIG. 3 in the scramble position. For ease in understanding the invention, FIG. 5 illustrates the universal unit with the mode switches 34, 41 depicted in the descramble positions. The key to the successful descrambling operation is the technique of recovering from the pilot signal any fluctuations in frequency introduced after the audio was scrambled, such as during the reproduction of the signals recorded on tape. To this end, the scrambled audio reproduced from the VCR unit 12 is coupled through an isolation amplifier 70 to a high pass filter 71 (shown in FIG. 9) which recovers the pilot signal having the nominal frequency of 8928 hz (but which may typically vary in frequency up to ±10% at a rate of change in frequency from 0-300 hz). The filter 71 provides a faithful replica of the pilot signal including the frequency and phase variations due to wow and flutter of the VCR unit. The filtered pilot signal is passed through another amplifier 72, a variable gain circuit 74 (shown in FIG. 10) and mode control switch 41 (when in the descramble position) to the input of LC oscillator 42. The purpose of oscillator 42 is to track the phase and frequency of the pilot signal and also reject some of the inverted side bands which might be present in the pilot signal. Also, the oscillator 42 compensates for any tape dropouts, which momentarily result in loss of the signal.

The output of the oscillator 42, which comprises the pilot tone at a frequency of 8928 hz ±2 Df, is coupled through a comparator unit 77 which squares up the signal prior to coupling to a divide by 2 unit 78. The output of unit 78 is a signal whose frequency is 4464 hz ± Df, where Df is the frequency variation introduced after the audio was scrambled, such as during the reproduction process. This signal is fed via mode switch 34 and low pass filter 36 to one input of mixer 31, the other input of which receives VFMS from the timing unit (FIG. 3). The output of mixer 31 is coupled via band pass filter 37 to one input of mixer 38, the other input to which is the second output of frequency synthesizer 32 filtered by filter 39. The output of mixer 38 is filtered by low pass filter 40 and comprises the demodulation carrier signal VFMO′.

With reference to FIG. 6, VFMO′, which is the demodulation signal whose frequency ranges from 4 khz to 5.6 khz ± Df, is coupled through a limiter 81 to provide a constant amplitude demodulation carrier signal to mixer 82. The other input to mixer 82 is the scrambled audio recovered from the VCR and filtered by low pass filter 83, which is essentially identical to low pass filter 59 of FIG. 4 and which eliminates the pilot signal from the scrambled audio. The output of mixer 82 is the demodulated audio signal output with the Df cancelled out, via taking the difference frequencies, and this signal is amplified via amplifier 85 and filtered via a low pass filter 86 having a cut-off frequency of 3500 khz. The output of filter 86 is coupled to the descrambled audio output of the unit.

As will now be apparent, the invention affords scrambling and descrambling for audio information signals which results in the recovery of the original audio information signals in a faithful manner, uncontaminated by any fluctuations in phase and frequency introduced by the electromechanical recording apparatus used to record and subsequently reproduce the signals. This is greatly facilitated by the pilot signal filter 71 which is nonresonating so that any variations in frequency introduced into the pilot signal by the recording and reproduction processing are not filtered out and readily appear in VFMO′. The descramble operation is further enhanced by the oscillator 42, which has a relatively broad (low) Q to facilitate locking onto the pilot signal frequency, and which also temporarily maintains the pilot signal frequency in the event of signal dropout.

While the above provides a full and complete disclosure of the preferred embodiment of the invention, various modifications, alternate constructions and equivalents will appear to those skilled in the art. For example, while specific edge frequencies have been illustrated for the various filters, other frequencies may be more suitable for other applications than those described herein. In addition, other techniques may be employed for varying the frequency of the modulation carrier signal, as desired. Therefore, the above descriptions and illustrations should not be construed as limiting the invention which is defined by the appended claims.

What is claimed is:

1. A method of scrambling audio information signals having frequency components lying within an original frequency spectrum, said method comprising the steps of:

(a) frequency shifting original time domain audio information signals to produce scrambled audio information signals;

(b) generating a pilot signal of a preselected frequency; and (c) recording both the scrambled audio information signals and the pilot signal on a common recording medium so that any frequency variations introduced in the scrambled audio signals upon playback are tracked by the pilot signal.

2. The method of claim 1 wherein said step (a) of frequency shifting includes the step of varying the magnitude of the frequency shift.

3. The method of claim 2 wherein said step of varying is performed pseudo randomly.

4. The method of claim 1 wherein said step (a) of frequency shifting includes the step of inverting the frequency spectrum of the original audio information signals.

5. The method of claim 4 wherein said step of inverting includes the step of performing single side band modulation of said audio information signals.

6. The method of claim 1 wherein said preselected pilot signal has a frequency outside the frequency band of said scrambled audio information signals.

7. The method of claim 1 further including the steps of generating coded information signals relating to the manner in which the frequency shifting is performed in step (a), and associating said coded information signals to the recorded scrambled audio information signals.

8. A method of descrambling audio information signals previously scrambled by frequency shifting original time domain audio information signals having frequency components lying within an original frequency spectrum and recording the frequency shifted audio information signals along with a pilot signal having a preselected frequency, said descrambling method comprising the steps of:

(a) reproducing the scrambled audio information signal and the pilot signal;

(b) using the pilot signal to generate a frequency restoring demodulation signal containing any frequency variations introduced by step (a); and (c) demodulating the reproduced scrambled audio information signals with the demodulation signal from step (b) to produce final audio information signals lying within the original frequency spectrum.

9. The method of claim 8 wherein said step (c) of demodulating includes the step of performing single side band modulation on said scrambled audio information signals.

10. The method of claim 8 wherein said scrambled audio information signals have associated coded information signals relating to the manner in which the frequency shifting was performed; and wherein said method further includes the steps of recovering the associated coded information signals and using the associated coded information signals to select the frequency of the demodulation signal.

11. The method of claim 10 wherein said associated coded information signals include a starting frequency indication signal; and wherein said step of using includes the step of using the starting frequency indication signal to initialize the initial demodulation frequency.

12. A system for scrambling audio information signals having frequency components lying within an original frequency spectrum, said system comprising:

means for frequency shifting original time domain audio information signals to produce scrambled audio information signals;

means for generating a pilot signal of a preselected frequency; and means for combining the scrambled audio information signal and the pilot signal prior to recording on a common recording medium so that any frequency variations introduced in the scrambled audio signals upon playback are tracked by the pilot signal.

13. The system of claim 12 wherein said frequency shifting means includes means for varying the magnitude of the frequency shift.

14. The system of claim 13 wherein said varying means includes means for pseudo randomly varying the frequency shift.

15. The system of claim 12 wherein said frequency shifting means includes means for inverting the frequency spectrum of the audio information signals.

16. The system of claim 15 wherein said inverting means includes a single side band modulator.

17. The system of claim 12 wherein said pilot signal has a frequency lying outside the scrambled audio information signal frequency band.

18. The system of claim 12 further including means for generating coded information signals relating to the manner in which the frequency shifting means operates and means for associating said coded information signals to the combined scrambled audio information signals and the pilot signal.

19. A system for descrambling audio information signals previously scrambled by frequency shifting original time domain audio information signals having frequency components lying within an original frequency spectrum and recording the frequency shifted audio information signals along with a pilot signal having a predetermined frequency, said descrambling system comprising:

means for reproducing the scrambled audio information signals and the pilot signal;

means responsive to the pilot signal for generating a frequency restoring demodulation signal; and means responsive to the demodulation signal for demodulating the reproduced scrambled audio information signals to produce final audio information signals lying within the original frequency spectrum and substantially devoid of any frequency variations introduced in the scrambled audio information signals upon reproduction.

20. The system of claim 19 wherein said demodulating means includes a single side band modulator.

21. The system of claim 19 wherein said scrambled signals have associated coded information signals relating to the manner in which the frequency shifting was performed; and wherein said descrambling system further includes means responsive to the associated coded information signals for enabling the demodulation signal generating means to control the frequency of the demodulation signal.

22. The system of claim 21 wherein said associated coded information signals include a starting frequency signal; and wherein said generating means is responsive to the starting frequency signal to select the initial demodulation signal frequency.

* * * * *